Oct. 15, 1935.  W. E. SPARROW  2,017,609

BALANCING OF TUBULAR SHAFTS

Filed Jan. 23, 1934

Inventor
William E. Sparrow
by Mawhinney & Mawhinney
Attorneys.

Patented Oct. 15, 1935

2,017,609

UNITED STATES PATENT OFFICE 2,017,609

BALANCING OF TUBULAR SHAFTS

William Edwin Sparrow, Birmingham, England, assignor to Hardy, Spicer & Company Limited, Birmingham, England Application January 23, 1934, Serial No. 707,990
In Great Britain February 10, 1933

2 Claims. (Cl. 74—573)

This invention relates to the balancing of tubular shafts, and particularly to the balancing of tubular propeller shafts for use in the transmission of power in motor-vehicles. It sometimes happens with motor-vehicles, particularly at high rotative speeds, that out-of-balance effects arise in tubular propeller shafts, due mainly to inequalities in the construction of the shaft (i. e., to variations in the wall thickness of the shaft) or to errors in the universal joints attached thereto, or in part to, or accentuated by, the slight irregularity in the transmission of torque from the engine to the road wheels through the universal joints at the ends of the shaft.

It is the main object of the present invention to obviate this disadvantage in a very simple manner.

According to the invention, one or more plugs are fitted into the interior of the shaft, as by being a press fit therein, and these are arranged and disposed so as substantially to counteract any out-of-balance effects along the shaft.

In the accompanying drawing:—

Figure 1:
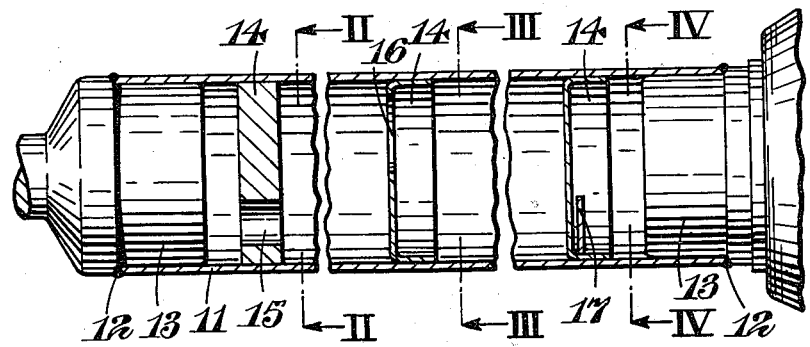
Figure 2:
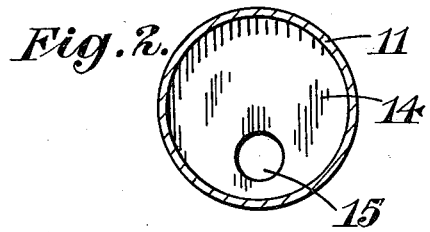
Figure 3:
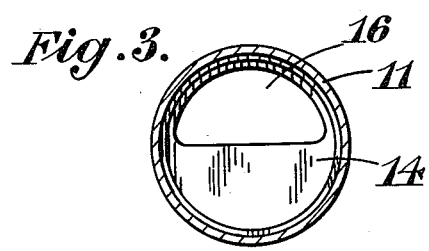
Figure 4:
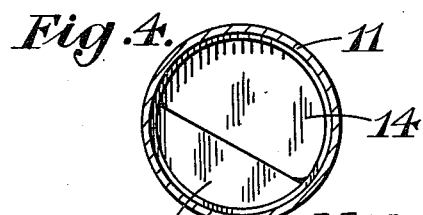

Figure 1 is a longitudinal fragmentary section through a propeller shaft carrying balancing plugs according to the invention, these being shown for purposes of illustration as being of different forms, and Figures 2, 3, and 4 show these plugs in end elevation, these figures being cross-sections on the appropriate lines of Figure 1.

In the construction illustrated, a tubular propeller shaft 11 for a motor-vehicle is welded at its ends 12 to parts 13 of universal joints which are adapted to spigot into the ends, and the plugs 14 are located at different places along the length of the shaft where out-of-balance effects would otherwise occur. Preferably the plugs are located by being pressed into position in the shaft, and they are formed with eccentric centres of mass, as necessary, to counteract the out-of-balance effects.

The plugs may be uniform discs, as shown in Figure 2, with one or more ecentric holes 15 drilled in them. Or cup-shaped pressings, as shown in Figure 3, with eccentrically-placed holes 16. Or cup pressings with one or more segmental or other plates eccentrically secured in their interiors, as by welding, such being indicated at 17 in Figure 4. I do not limit myself to the form of plug or the method of their attachment.

Thus, by means of the invention, the plugs being inserted just at those places where the weight has to be increased, the out-of-balance effects can be reduced in a very simple manner.

What I claim as my invention and desire to secure by Letters Patent of the United States is:—

1. The combination with a tubular propeller shaft welded at its ends to parts of universal couplings which spigot into the ends, of plugs formed with eccentric centres of mass and fitted in the interior of the shaft, at different places along its length, so as to substantially counteract any out-of-balance effects which would otherwise occur on the rotation of the shaft.

2. The combination with a tubular shaft, of a cup-shaped plug fitted in the interior of the shaft, the plug having a member eccentrically attached to it.

WILLIAM EDWIN SPARROW.